Aug. 14, 1951     F. WALLER ET AL     2,563,893
APPARATUS FOR HOLDING AND GUIDING A CHAIN
OF SLIDES FOR SUCCESSIVE DISPLAYS
Filed Nov. 17, 1948     3 Sheets-Sheet 3

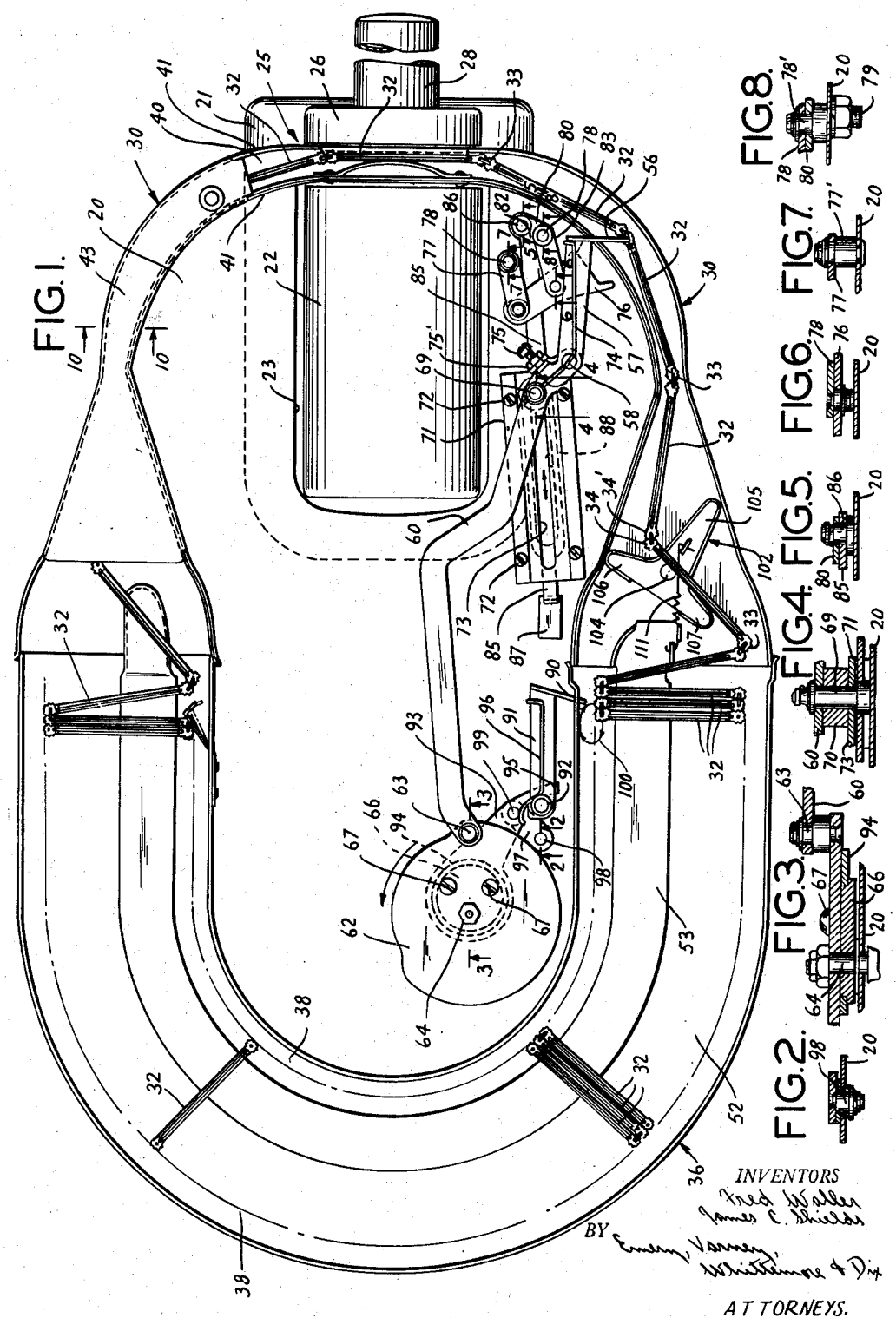

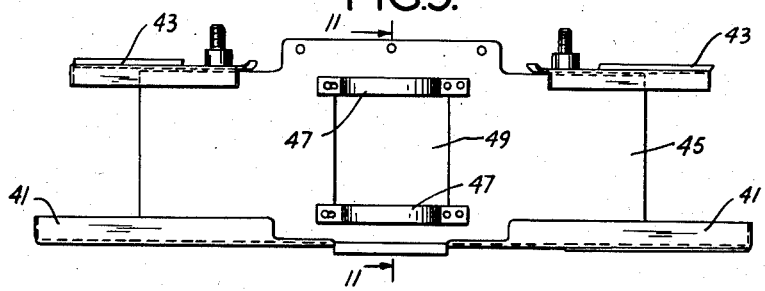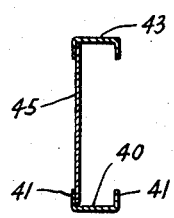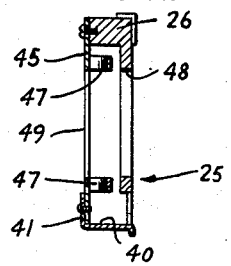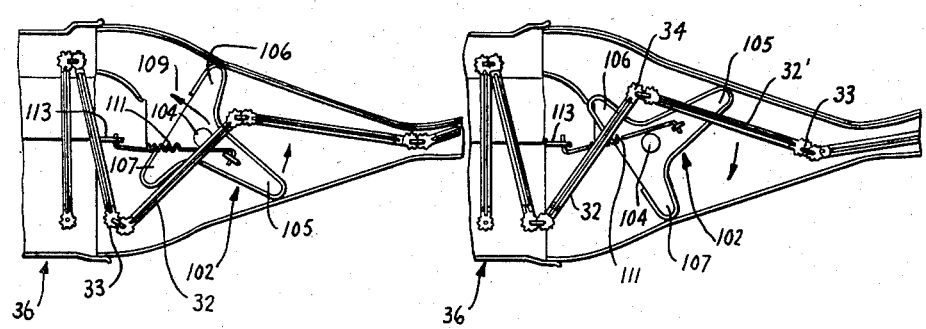

INVENTORS
Fred Waller
James C. Shields
BY Emery, Varney,
Whittemore & Dier
ATTORNEYS Patented Aug. 14, 1951

2,563,893

UNITED STATES PATENT OFFICE 2,563,893

APPARATUS FOR HOLDING AND GUIDING A CHAIN OF SLIDES FOR SUCCESSIVE DISPLAY

Fred Waller, Huntington, and James C. Shields, Great Neck, N. Y., assignors to The Vitarama Corporation, Huntington Station, N. Y., a corporation of New York Application November 17, 1948, Serial No. 60,542

10 Claims. (Cl. 88—28)

This invention relates to apparatus for holding slides for display in a predetermined sequence.

It is an object of the invention to provide improved apparatus for moving successive slide holders into position at a projection station. Features of the invention relate to supports along which the slide holders are movable in a vertical position around an endless guideway so that a showing of a sequence of slides can be repeated without having to reverse the slide changing mechanism to return the slide holders to their starting position before they are used again.

Another object of the invention is to provide apparatus for moving a chain of slide holders around a guideway with the slide holders in an extended relation to one another at the region of a projection station, and in a compact folded relation with one another around another portion of the guideway.

Other features of the invention relate to guiding means, to mechnaism for folding the slide holders upon one another, and to a combination of feeding devices for advancing different portions of a slide chain simultaneously.

Other objects, features and advantages of the invention will appear or be pointed out as the description proceeds.

In the drawing, forming a part hereof, in which like reference characters indicate corresponding parts in all the views:

Figure 1 is a top plan view of the apparatus for guiding and feeding a chain of slide holders in accordance with this invention.

Figures 2 to 8 are enlarged, fragmentary sectional views taken on the lines 2—2 to 8—8, respectively, of Figure 1.

Figure 9 is a front view of the slide holder guideway at the projection station with a portion of the structure removed.

Figure 10 is a sectional view taken on the line 10—10 of Figure 1.

Figure 11 is a sectional view taken on the line 11—11 of Figure 9 with the front of the projection station secured in place.

Figures 12 and 13 are fragmentary views illustrating the operation of the slide folding mechanism shown in Figure 1.

Figures 14, 15:
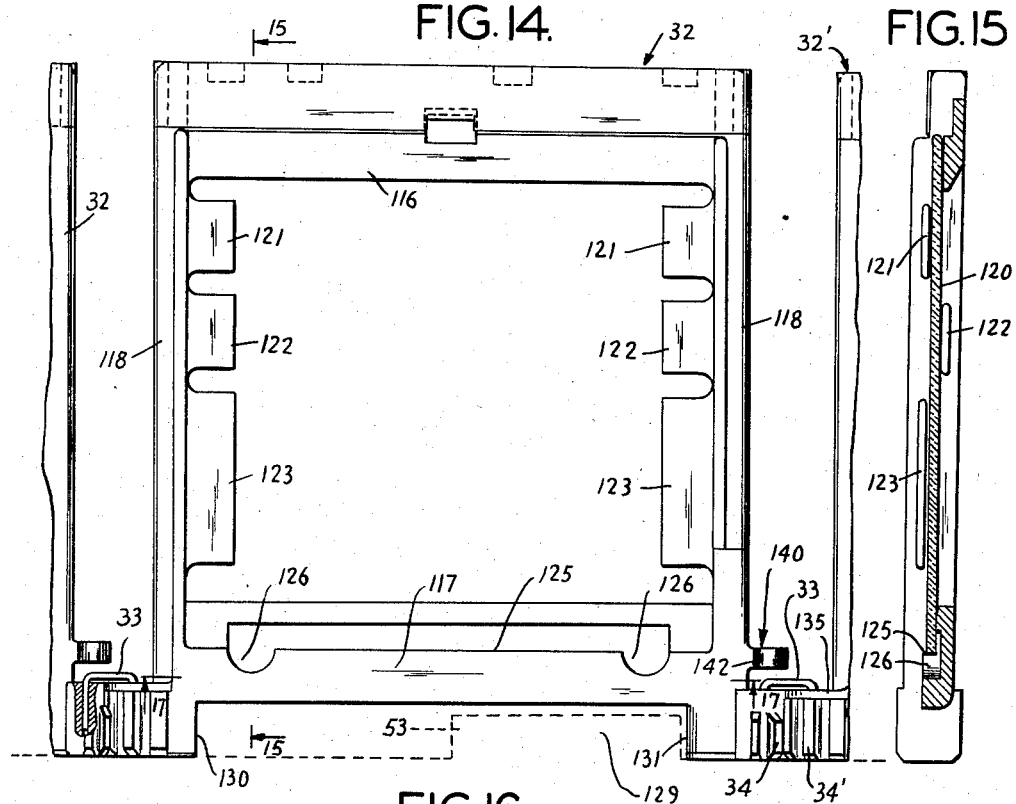
Figure 14 is a greatly enlarged view of a portion of the chain of slide holders.
Figure 15 is a sectional view on the line 15—15 of Figure 14.
Figure 16:
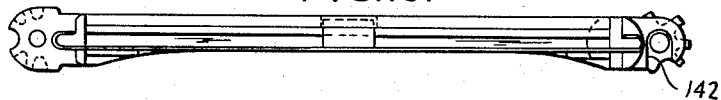
Figure 16 is a top plan view of the middle slide holder of Figure 14.

The apparatus shown in Figure 1 includes a base plate 20 which is mounted on top of a projector 21. The projector has a lamp housing 22 which extends upward through an opening 23 in the plate 20. The lamp housing is above the level of the plate 20 and supplies light to a projection station 25.

A support 26 attached to the projector 21 in front of the projection station 25 carries a lens mount 28 that is adjustable toward and from the projection station to accommodate the apparatus to screens located at different distances from the projector.

There is an endless guideway around the plate 20. At the forward portion of the plate 20 the guideway has a narrow portion 30 for supporting and guiding a series of slide holders 32 as they approach and pass beyond the projection station 25. These slide holders are connected together to form a chain, there being a short link 33 connecting each of the slide holders 32 to the next successive slide holder, and the chain of slide holders is preferably an endless chain, that is, the slide holder having the last picture is linked to the slide holder having the first picture of the sequence.

Each of the slide holders has a gear segment 34 at each end. The centers of these gear segments are on the axes of the pivotal connections between the slide holders and the connecting links 33. The gear segments 34 have pitch diameters equal to the effective length of the links 33 so that the teeth of the gear segments 34 of connected slide holders mesh with one another and cause the slide holders to fold against one another as they swing about their pivotal connections with the links 33.

It is a feature of the construction that the gear segments 34 have diameters at least as great as the maximum thickness of the slide holders so that the slide holders can be folded back and forth upon one another into parallel relation. When in this folded relation, the slide holders form a compact group and this makes it possible to have a large number of slides contained within an apparatus of comparatively small overall dimensions.

There is a wide portion 36 of the guideway extending around the rearward portion of the plate 20, and this wide portion 36 is wide enough to accommodate the chain of slide holders with the slide holders in their folded condition. Figure 1 shows folded slide holders at opposite ends of the wide portion 36 of the guideway, and shows some slide holders at different locations along the guideway, but it will be understood that the dot and dash lines 38 represent the inner and outer edges of a compact group of folded slide holders filling the entire length of the wide portion 36 of the guideway.

In the preferred construction of the invention, the slide holders always remain in a vertical position with their lower ends resting on the bottom 40 of the guideway. The narrow portion 30 of the guideway has sides 41 which extend upward from the bottom 40 for a limited distance, as shown in Figures 9 and 11. Part of the length of the guideway is covered by a top 43. The rearward side 41 is connected with the top 43 along a portion of the length of the guideway by a back wall 45.

At the projection station 25 there are a pair of leaf springs 47 attached to the back wall 45 in position to contact with the slide holders near their upper and lower ends above and below the picture fields of the slides. These leaf springs 47 hold each successive slide holder in contact with the back of the support 26 when the slide holder is in position for projection. There is an opening 48 in the support 26 immediately behind the lens and there is an opening 49 in the back wall 45 in substantial alignment with the opening 48 for the passage of light from the lamp housing.

Referring again to Figure 1, the wide portion 36 of the guideway includes a bottom 52 on which the lower ends of the slide holders rest, and there is a ridge 53 extending upward from the bottom 52 for guiding the slide holders around the curve of the wide portion of the guideway. Each of the slide holders has a recess in its bottom edge for fitting over the ridge 53, as will be explained more fully in connection with the detailed description of the slide holders.

Feeding apparatus for advancing the slide holders along the guideway includes a claw 56 secured to the forward end of an arm 57. This arm has a pivot connection 58 with the forward end of a lever 60.

The lever 60 has one end connected to a disc 62 by a crank pin 63. The disc 62 is connected to the upper end of a drive shaft 64 which is rotated by an electric motor. An eccentric 66 is secured to the under side of the disc 62 by screws 67.

At the other end of the lever 60 there is a pin 69 extending through an opening in the lever 60, and extending through a similar opening in a spacer plug 70. The spacer plug 70 rests on a channel element 71, attached to the plate 20 by screws 72. There is a slot 73 in the channel element 71, and the pin 69 moves back and forth in a straight line along this slot 73 while the other end of the lever 60 moves around the orbit of the crank pin 63. The lower end of the pin 69 rides on the surface of the plate 20 as a bearing.

The arm 57 is urged by a spring 74 to move in a clockwise direction around its pivot connection 58, but the lefthand end of the arm 57, beyond the pivot 58, strikes against a screw 75 which limits the extent to which the spring 74 can move the arm 57. This screw 75, which comprises an adjustable abutment for determining the normal position of the arm 57 with respect to the lever 60, extends through a lug 75' which projects upward from the lever 60 and which is preferably an integral part of the lever 60. A lock nut or any other suitable locking device can be used for holding the screw 75 in its set position.

In the operation of the apparatus, the disc 62 is rotated through one complete revolution each time that a control switch for the driving motor is closed. This control of the operation can be performed by means of a one-turn clutch or various other expedients which are not illustrated since they are not a part of the invention and their illustration is not necessary for a complete understanding of the invention.

As the crank pin 63 moves around its orbit, the lever 60 moves the pin 69 from one end of the slot 73 to the other end and back again. The pivot connection 58, which is spaced some distance from the pin 69 moves along a path which is approximately the shape of a long ellipse, having its major axis parallel to the slot 73. The claw 56 at the free end of the arm 57 also moves along a generally elliptical path, but along a path in which the minor axis of the ellipse is considerably greater than in the case of the pivot connection 58, since the claw 56 is spaced further from the pin 69 about which the lever 60 rocks.

The crank pin 63 moves in the direction indicated by the arrow, and during the first part of the movement of the crank pin 63 from the position shown in Figure 1, the claw 56 moves toward the chain of slide holders and the adjustment of the apparatus is intended to be such that the claw 56 will move into the space between two connected slide holders. If the claw 56 is too far to the right and strikes the slide holder beyond the space, the spring 74 will yield so that the lever 60 can continue to rock without moving the claw 56 any further.

As the crank pin 63 continues to move counterclockwise around its orbit, it pulls the lever 60 toward the left, moves the pin 69 along the slot 73, and causes the claw 56 to move toward the left. If the claw is in the space between two slide holders, this movement of the claw brings it into contact with the rearward edge of one slide holder and pushes the slide holder along the guideway. If the claw 56 has contacted with one of the slide holders beyond the open space into which the claw is intended to engage, the initial movement of the claw brings it up to the space between the slide holders, and the spring 74 pushes the claw into the space so that it can engage the rearward edge of the slide holder ahead of it and feed the slide holders forward along the guideway.

The feeding movement continues until the crank pin 63 reaches the dead center position at which the pin 69 stops moving at the lefthand end of the slot 73. During the movement of the crank pin to this dead center position from the position shown in Figure 1, the rocking movement of the lever 60 causes the claw 56 to move with a component of its motion transverse of the chain of slide holders, first inward and then outward, but it is a feature of the construction that the claw 56 is long enough to permit this movement further into the opening between slide holders without having the arm 57 strike the slide holders.

As the crank pin 63 moves beyond its left hand dead center position, it continues to rock the lever 60 counterclockwise and pulls the claw 56 out of the space between the slide holders so that the claw 56 can return to its original position without moving the slide holders backward. The width of the space between adjacent slide holders is substantially greater than the width of the claw 56 so that the initial reverse movement of the claw, before the arm 57 has swung far enough to withdraw the claw from between the slide holders, does not bring the claw back into contact with the slide holder behind it.

Provision is made for locking the slide holders in position so that there is no possibility of their moving when the claw 56 is reversed to carry it back to its original position for another feed stroke. The locking means comprises a yoke 76 with tabs on its ends in position to embrace gear segment portions of adjacent slide holders between the tabs to prevent movement of the chain of slide holders.

The yoke 76 is carried by two parallel links 77 and 78. The link 77 rocks about a fulcrum 77' (Fig. 7) attached to the base plate 20. The link 78 (Fig. 8) rocks about a fulcrum 78' which is an eccentric stud at the upper end of a bolt 79. By rotating this bolt 79, the location of the fulcrum of the link 78 can be moved sufficiently to obtain the desired range of adjustment of the stroke of the yoke 76. The purpose of this adjustment is to bring the tabs on the yoke 76 into correct positions for embracing the lower portions of the adjacent slide holders in the region behind the gear segments.

The link 78 is rocked about its fulcrum 78' by a connecting link 80 which forms with the link 78 a resilient bell crank. The links 78 and 80 are not integrally connected, but there is a spring 82 which urges the link 78 to rock counterclockwise around its pivot 78' and into contact with a lug 83 extending upward from the link 80 beyond the fulcrum 78'.

As long as the spring 82 holds the link 78 firmly against the lug 83, the links 78 and 80 operate in unison as a bell crank, but at any time that the tabs on the yoke 76 come in contact with a slide holder instead of moving into spaces behind the gear segment portions of the slide holders, the spring 82 will yield and permit the connecting link 80 to move without imparting further movement to the link 78 or the yoke 76. This is a safety feature similar to that provided by the spring 74 which yields when the claw 56 encounters a slide holder.

The connecting link 80 is rocked counterclockwise at the end of each feeding stroke to push the yoke 76 into position to block retrograde movement of the slide holder chain; and at the end of each return stroke of the feed claw 56, the connecting link 80 is rocked clockwise back into the position shown in Figure 1.

This movement of the connecting link 80 is imparted to it by a shuttle bar 85 that is connected with the link 80 by a pin 86. The shuttle bar 85 extends along the entire length of the channel element 71, and the free end of the shuttle bar 75 is a tab bent downward through an opening 87 in the plate 20. This tab extending through the opening 87 provides a loose connection between the shuttle bar 85 and the plate 20.

There is a slot 88 in the shuttle bar 85, and this slot 88 is somewhat shorter than the stroke of the pin 69 so that during the last part of the stroke of the pin 69, in either direction, the pin 69 displaces the shuttle bar 85 lengthwise and pulls the pin 86 far enough to impart the desired angular movement to the connecting link 80.

The claw 56 feeds the chain of slide holders along the guideway 30, and pushes the slide holders against a switch element that moves them into folded positions at the beginning of the wide portion 36 of the guideway. A second feeding mechanism is provided for moving the folded slide holders around the wide portion of the guideway, and it will be apparent that the stroke of this second feeding mechanism must be very much shorter than the stroke of the claw 56 which moves the slide chain during each feeding stroke for a distance equal to the full length of a slide holder. The second feeding mechanism that feeds the folded slide holders advances them for a distance equal to only the thickness of the slide holders with each feeding stroke.

The mechanism for moving the folded slides comprises a claw 90 at one end of an arm 91 which is connected by a pivot 92 with a lever 93. This lever 93 is integrally connected with an eccentric strap 94 surrounding the eccentric 66. A spring 96 urges the arm 91 to rock in a clockwise direction around the pivot 92 but there is a lug 95 extending upward from the lever 93 in position to serve as an abutment for limiting the movement of the arm 91 by the spring 96.

Another link 97 rocks about a fixed stud 98 extending upward from the plate 20 The other end of this link 97 is connected with the lever 93 by a pivot 99 between the eccentric 66 and the pivot 92. This link 97 causes the arm 91 and its claw 90 to move around a substantially elliptical path which is a resultant of the movement of the eccentric strap 94 under the confining influence of the rocking link 97.

The path of movement of the end of the claw 90 is indicated by the orbit 100. The claw 90 moves into position to engage between successive slide holders, then moves forward into contact with a frame of the forward slide holder, and continued movement of the claw 91 advances the slide holder and all of those ahead of it along the length of the wide portion 36 of the guideway. If the claw 90 comes into contact with one of the slide holders instead of moving into the space between successive slide holders, the spring 96 will yield so that the mechanism for operating the arm 91 can continue to move until the claw 90 comes into position to be pushed into a space between slide holders by the spring 96.

In the construction shown in Figure 1, the space between the slide holders when in folded position is not apparent, but it will be understood that the claw 90 is at an intermediate level between the upper and lower ends of the slide holders and above the gear segments 34 where there is a space between successive slide holders when the slide holders are folded with their gear segments in contact with one another.

In order to make the slide holders fold as they pass from the narrow guideway portion 30 to the wide portion 36 of the guideway, switch 102 is placed at the region where the width of the guideway changes. This switch is a T-shaped element connected to the base plate 20 by a stud 104 on which the switch can rock from the position shown in Figure 12 to the position shown in Figure 13.

The switch 102 has a stem 105 for guiding the slide holders, and has two branches 106 and 107 for shifting the switch to move the stem 105 to the other side of the guideway. When the stem 105 of the switch is against the one side of the guideway, as shown in Figure 12, a downwardly extending shoulder near the trailing end of the slide holder 32 is guided by the stem 105 toward the side of the guideway away from the stem 105 so that the slide holder 32 which is astride of the switch element 102, rocks counterclockwise in the direction indicated by the arrow 109. The downwardly extending shoulders of the slide holders will be described more fully in connection with Figs. 14 and 18 where the shoulders are designated by the reference characters 130 and 131. These shoulders are not visible in Figs. 12 and 13, which are top plan views.

As the chain of slide holders continues to feed progressively along the guideway, the downwardly extending shoulder of the slide holder 32 which is moving along the stem 105, strikes the branch 106 of the switch element and rocks the switch element counterclockwise about its pivot 104. The downwardly extending portions of the slide holders, therefore, comprise means operating in timed relation with the movement of the chain for shifting the abutment or stem 105 from one side to the other into positions to deflect successive slide holders in different directions as they come into contact with the stem 105.

There is a tension spring 111 connected at one end to the stem 105 of the switch element and connected at its other end to an anchor 113 extending upward from the bottom of the guideway. This spring 111 passes along opposite sides of the pivot 104 when the stem 105 of the switch element is in contact with opposite sides of the guideway. As soon as the switch element 102 has been rocked from its Figure 12 position to a position that carries the spring 111 across the axis of the pivot 104, the tension of this spring 111 will snap the switch element 102 into the position shown in Figure 13.

As the chain of slide holders continues to move, the slide holders 32 which caused the switch element 102 to shift will clear the stem 106 and continue to fold toward a position parallel with the slide holders ahead of it. From a comparison of Figures 12 and 13 it will be evident that the stem 105 of the switch element moves into a position under the next slide holder, indicated by the reference character 32' in Figure 13.

Continued movement of the chain of slide holders brings a shoulder at the lower righthand end of slide holder 32' into contact with the stem 105 of the switch element. The sloping side of the stem 105 causes the slide holder 32' to move clockwise and strike against the branch 107 of the switch element. As the slide holder moves further, it rocks the switch element 102 about its pivot 104 until the spring 111 snaps the switch element 102 back into the position shown in Figure 12. In this way successive slide holders are made to fold first one way and then the other into a zig-zag relation that permits them to move into a compact parallel relation as they are pushed toward the pack of folded slide holders on the wide portion 36 of the guideway.

Figure 14 shows one of the slide holders, and portions of two adjacent slide holders with the link connections by which these slide holders are connected. The slide holder 32 has a top 116, bottom 117, and side portions 118 forming a frame for holding slide 120 (Figure 15). There are lugs 121, 122 and 123 extending from the side portions 118 on different sides of the slide 120 for maintaining the slide in position. The lower edge of the slide rests upon a shoulder 125 along the bottom portion 117 of the slide holder. There are recesses 126 in the shoulder 125 to facilitate the removal of a slide from the slide holder whenever it is desirable to replace one slide with another.

There is a recess 129 at the bottom of the slide holder 32 and this recess has shoulders at its opposite ends, preferably a straight shoulder 130 at one side and a round shoulder 131 at the other side. These shoulders are unsymmetrically located, the rounded shoulder being nearer to the centre of the slide than is the flat shoulder 130.

When the slide holders are folded parallel against one another, the rounded shoulders 131 of alternate slides are located at the right-hand side of the slide guideway, and it is these rounded shoulders only which contact with the guide ridge 53 which is shown in dotted lines in Figure 14. This expedient of guiding only alternate slides makes it possible for the slides to accommodate themselves to the curve in the guideway and prevents binding of the pivotal connections by the successive slides such as might occur because of different manufacturing tolerances.

The right-hand end of the slide holder 32 is shown connected with the slide holder 32' in Figure 14. The gear segment on the slide holder 32' is indicated by the reference character 34'. The gear segments 34 and 34' on each of the slide holders are integral parts of the slide holders.

Figure 18:
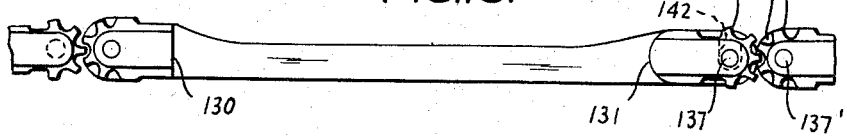
Figure 18 is a bottom view of the structure shown in Figure 14.

The gear segment 34' has a shroud 135 covering the upper ends of its teeth and closing the upper ends of the space between the teeth except at the middle space which is engaged by the middle tooth of the gear segment 34 when the slide holders are in alignment, as shown in Figure 18.

The middle tooth of the gear segment 34 is longer than the teeth of the gear segment 34' and preferably extends into the notch in the shroud 135 at the upper end of the gear segment 34'. The other teeth of the gear segment 34 are somewhat shorter than the teeth of the gear segment 34'. With this construction the gear segment 34 can be raised out of mesh with the gear segment 34' when the slide holders are in alignment, but not when the slide holders are folded with respect to one another. The teeth of the gear segment 34 will strike against the shroud 135 to prevent further upward movement of the gear segment 34 with respect to the gear segment 34' when the slide holders are folded.

The link 33 comprises an inverted U-shaped element with the sides of the U extending downward into openings 137 and 137' at the centers of the gear segments 34 and 34'. There is a lug 140 extending out from the side of the slide holder 32 above the link 33. This lug 140 has a slot 142 extending in from one side and located immediately above the opening into which the link 33 fits into the gear segment 34. This slot permits the link 33 to be removed and inserted into the gear segments 34 and 34' when the slide holders are folded into parallel relation with one another.

Figure 17:
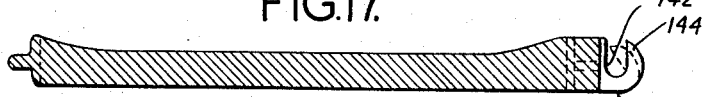
Figure 17 is a sectional view taken on the line 17—17 of Figure 14.

When in such relation the slot 142 extends in a direction parallel to the position in which the link 33 must be placed when removing it from, or inserting it into, the openings in the gear segments. After the link 33 is in place a portion of the lug 140 comprising a tab 144 is bent from the solid line to the dotted line position shown in Figure 17, and with the tab 144 in such position closing the slot 142, it is not possible to remove the link 33 from the gear segment 34.

These connections between the slide holders make it possible to pick up a folded group of slide holders by the end slides, and the group will remain intact since all of the slides are held against any substantial vertical movement with respect to one another by the shroud 135 and the tab 144. The slide holders are prevented from becoming unfolded by merely exerting some endwise pressure against the group when picking them up.

The preferred embodiment of the invention has been illustrated and described, but some features of the invention can be used alone or in different combination without departing from the invention as defined in the claims.

What is claimed is:

1. Apparatus for moving slides successively into position at a projection station, said apparatus comprising a guideway for supporting a chain of slide holders, a reciprocating feeder that engages successive slide holders in the chain when moving in one direction, mechanism for operating the feeder through a stroke substantially equal to the length of a slide holder, a second feeder located at another region along the guideway in position to engage slide holders that are in a folded relation with one another, mechanism for operating the second feeder through a short stroke substantially equal to the width of a slide holder, and a common actuator that supplies power to both mechanisms to maintain the operation of the feeders in timed relation, said mechanisms having different mechanical advantages for driving the respective feeders.

2. A slide changer for use with slide holders that are connected together to form a chain in which the successive slide holders are movable into an extended relation with respect to one another at the region of a projection station and foldable back and forth against one another at a region beyond the projection station, said slide changer including a support under the chain of slide holders, guide means along the sides of the support for guiding the extended chain at regions ahead of and beyond the projection station and for guiding the folded chain at another region, a feeder movable along a generally elliptical path at one side of the guide means near the projection station, another feeder movable along a generally elliptical path, much shorter than the path of the first feeder, at a region of the guide means which guides the folded chain, mechanism for operating the feeders in timed relation with one another including means for shifting a portion of each feeder inward into position to engage a portion of the slide holder chain near the beginning of the stroke of the feeder in one direction.

3. A slide changer comprising an endless chain of slide holders that are connected together by pivot connections on which the successive holders are movable into an extended relation to one another or into folded condition with one slide holder folded against the preceding and succeeding slide holders of the chain, an endless guideway including a relatively narrow portion on both sides of a projector station for guiding a portion of the chain in which the slide holders are in extended relation with one another, said guideway including also a wide portion with means for guiding the chain while the slide holders are in folded condition, the wide portion of the guideway being curved through a substantial arc for guiding the successive slide holders from the discharge end of the narrow portion of the guideway back to the entrance end of said narrow portion, two different feeders for advancing the chain of slide holders, said feeders including one feeder that is located along the narrow portion of the guideway and that has an element which engages successive slide holders that are in extending relation to one another, and a second feeder that is located along the wide portion of the guideway where the slide holders are in folded condition, said second feeder having an element that engages successive slide holders that are in folded condition, and mechanism that operates the respective feeders through strokes having a ratio to one another substantially equal to the ratio of a slide holder width to the effective thickness of the slide holder.

4. A slide changer for moving a chain of slide holders along a guideway which passes a projection station, said slide changer including walls along the guideway for guiding the chain of slide holders in the region of the projection station, other walls for guiding the slide holders along another region of the guideway beyond the projection station, separate feeders located along the different walls, a claw operated back and forth through a stroke by each feeder, means for moving the claws into engagement with the slide holders during the strokes of the claws in one direction, and a connection between at least one of the claws and its feeder including a portion that yields as the feeder continues to operate after the claw has moved with a component of its movement transverse of the chain of slide holders and into contact with a side of said chain.

5. A slide changer comprising a channel-shaped guideway with a bottom along which the lower ends of a group of successive slide holders move, side walls for guiding said slide holders, a feeder at one region of the guideway operable to engage and advance the successive slide holders along the guideway, and a second feeder located at a different region lengthwise of the guideway in position to advance said slide holders along that portion of the guideway, a common actuator for operating both of the feeders, and motion transmitting connections of different mechanical advantage between said actuator and the respective feeders.

6. The combination comprising an endless chain of slide holders connected together by link connections on which the slide holders are movable into extended relation with respect to one another or into folded relation with each slide holder against the preceding and succeeding slide holders of the chain, an endless guideway including a narrow portion which holds the slide holders in extended relation while they move to and beyond a projection station, and a wide guideway portion which is curved and leads from the discharge end of the narrow portion of the track guideway to the entrance at the opposite end of said narrow portion, apparatus for folding the slide holders against one another as they come into the wide portion of the guideway, and means for guiding each of the folded slide holders around the curve of the wide portion of the guideway, said means including a ridge and a recess, one of which is at the bottom of the slide holder and the other of which extends along the bottom of the guideway around the curved portion of the guideway, said ridge extending into the guideway and having one of its side surfaces in contact with the side surface of the recess.

7. A slide changer for use with slide holders that are linked together and that are movable on their linked connections into extended relation with respect to one another or into folded relation, said slide changer comprising a guideway having a narrow portion along which a section of the slide holder chain moves with the slide holders in extended relation, said guideway also having a wider portion along which another section of the chain moves with the slide holders in folded relation, apparatus located along the guideway and operable to advance the slide holders along the guideway, said apparatus including a switch between the narrow and wider portions of the guideway for folding the slide holders as they move from the narrow portion to the wider portion of the guideway, a center pivot on which the switch is movable at its forward end from one side of the guideway to the other in the path of the slide holders, and branches extending from opposite sides of the switch in position to be struck by parts of the successive slide holders to swing the switch to the other side of the guideway into position to fold the next slide holder in a direction opposite to that in which the immediately preceding slide holder folded.

8. A slide changer for use with slide holders that are linked together and that are movable on their linked connections into extended relation with respect to one another or into folded relation, said slide changer comprising a guideway having a narrow portion along which a section of the slide holder chain moves with the slide holders in extended relation, and having a wider portion along which another section of the chain moves with the slide holders in folded relation with one another, apparatus located along the guideway and operable to advance the chain of slide holders along the guideway, a switch located at the region where the guideway changes from its narrow to its wider portion, said switch comprising an abutment located in the path of the slide holders and movable into different positions for causing the slide holders to fold successively toward the right and left as the chain moves into the wider portion of the guideway, a support on which the abutment is movable, and means operating in timed relation with the movement of the chain for shifting the abutment from one side to the other into positions to deflect successive slide holders in different directions as they come into contact with said abutment.

9. Slide changing apparatus comprising a plurality of slide holders connected together by links on which the slide holders can swing into extended relation with respect to one another or in a folded relation with each slide holder folded against the preceding and succeeding slide holders, each of said slide holders equipped with a gear segment having a pitch diameter equal to substantially one-half of the effective length of the link so that the gear segments of the connected slide holders mesh with one another and cause the slides to fold against one another as they swing about their linked connections, a guideway along which the connected slide holders move with each of the slide holders in a vertical position, said guideway including a narrow portion with guide surfaces for maintaining the slide holders in extended relation with respect to one another as they move to and beyond a projection station, said guideway including also a wide portion with a curved surface for guiding the folded slide holders, a switch connected with a fixed pivot at a region between opposite sides of the guideway, said switch having a forward end movable from one side of the guideway to the other in the path of the slide holders for deflecting slide holders toward one side or the other to initiate their movement into folded relation with one another, branches extending from opposite sides of the switch near its rearward end in position to be struck by parts of the slide holders to shift the forward end of the switch alternately from one side of the guideway to the other with the passage of each successive slide holder, and a recess at the lower end of each slide holder in such position and of such length as to provide clearance for the passage of the switch under a slide holder as the switch shifts from one side of the guideway to the other.

10. The combination comprising a guideway for lantern slide holders, said guideway having a portion that is wide enough to receive a chain of slide holders that are folded back and forth upon one another, a switch in the guideway comprising an arm in the path of the slide holders, a toggle spring connected with the arm and operable to hold the arm toward either one side or the other of the guideway, and a projection on the arm in position to be operated by an abutment surface on the slide holder to shift the arm and cause the toggle spring to hold the arm on the side of the guideway to which it is shifted by the abutment surface on the slide holder.

FRED WALLER.
JAMES C. SHIELDS.

REFERENCES CITED

The following references are of record in the file of this patent:

UNITED STATES PATENTS

| Number | Name | Date |
|---|---|---|
| 1,028,692 | Dusseris et al. | June 4, 1912 |
| 1,573,030 | Bergere | Feb. 16, 1926 |
| 2,194,240 | Worth | Mar. 19, 1940 |
| 2,391,879 | Chambers | Jan. 1, 1946 |

FOREIGN PATENTS

| Number | Country | Date |
|---|---|---|
| 177,045 | Great Britain | Mar. 23, 1922 |
| 614,494 | France | Sept. 20, 1926 |
| 617,627 | France | Nov. 22, 1926 |
| 467,951 | Great Britain | June 25, 1937 |